Dec. 22, 1970 — A. R. THOMPSON — 3,550,156
EDGE WRITING RECORDER WITH CORE MAGNET
Original Filed Aug. 21, 1967
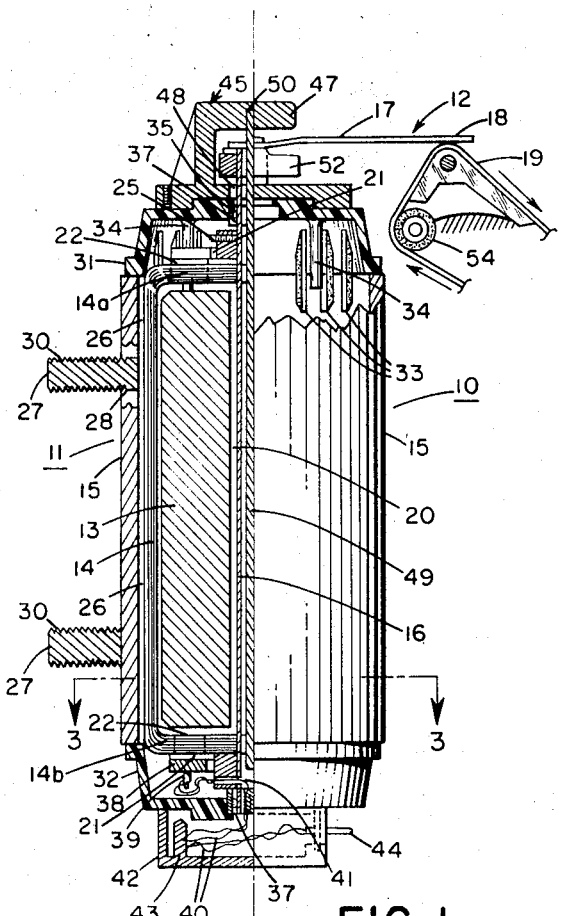
INVENTOR.
ALLAN R. THOMPSON

United States Patent Office 3,550,156
Patented Dec. 22, 1970

3,550,156
EDGE WRITING RECORDER WITH CORE MAGNET
Allan R. Thompson, Westlake, Ohio, assignor to Clevite Corporation, a corporation of Ohio
Continuation of application Ser. No. 661,934, Aug. 21, 1967. This application Dec. 23, 1968, Ser. No. 789,649
Int. Cl. G01d 15/24; G01r 5/06
U.S. Cl. 346—139                7 Claims

ABSTRACT OF THE DISCLOSURE

In an edge writing recorder, a cylindrical permanent core magnet, magnetized transversely across its cylindrical axis, is encompassed longitudinally by a tubular high permeability support means which acts as a magnetic flux return path. A magnetic flux is created in the gap between the core magnet and the support means. A driving coil is spaced concentrically about the core magnet and in the flux gap. The flux gap has decreasing flux density away from the maximum magnetic intensity plane of the magnet and nearly corrects for a tangent error inherent to the writing trace of edge recording devices.

CROSS-REFERENCES TO RELATED APPLICATION

This is a continuation of application Ser. No. 661,934 filed Aug. 21, 1967, now abandoned.

BACKGROUND OF THE INVENTION (1) Field of the invention

This invention relates to edge writing recorder devices for making visual records of electrical input signals. More particularly, this invention relates to edge writing recorders having permanent core magnet drive motor systems.

(2) Description of the prior art

Heretofore, as illustrated by Pat. No. 3,317,916— Thompson, assigned to the same assignee as the present invention, magnetic pen recorders have comprised a moving coil galvanometer in which a coil of electrically conductive wire is rotatably mounted between the opposite polarity pole faces of a permanent magnet system. The electrical signal which is to be recorded is applied to the coil, and the coil turns angularly by an amount proportional to the amplitude of the signal. A recording stylus coupled to the coil records a visual trace on a moving record chart of paper or the like.

In most recorders of this general type, the recording stylus was arranged to turn angularly in unison with the coil. However, in many instances the user of such a recorder may prefer to have a record with a rectilinear trace, i.e., one in which the recording tip of the stylus records straight line traces extending perpendicular to the length of the record. In addition, it is desirable that the length of the trace or record for a given amount of voltage input be constant regardless of the initial angular deflection of the coil at the time the signal is transmitted to the coil.

An inherent problem associated with a rectilinear recorder which writes over a straight edge is a tangent $\theta$ error ($\theta$ is defined as the angle of deflection of the coil from the no signal or rest position) involved in the conversion of rotary motion of the coil to a rectilinear trace drawn over a straight edge. This tangent error increases as $\theta$ increases. This increase results because as the coil and subsequently the writing portion of the writing arm moves from its rest position, the effective length of the writing arm increases from its pivot point to the point of contact with the straight edge. Hence, a constant increment of angular deflection away from the no signal position gives a steadily increasing increment of trace length along the straight edge.

Therefore, an important object of the present invention is to provide an edge writing recorder which substantially reduces or nearly eliminates the tangent $\theta$ error by the construction of the recorder itself, i.e., without external means, or additional components.

A further object of the present invention is to provide a high torque edge writing oscillographic system having reduced size and weight while still maintaining rugged, through-shaft, bearing supported construction.

In addition, it is an important object of this invention to provide in an edge writing recorder a novel and improved arrangement for producing a rectilinear visual trace on a record chart.

In the past, core magnets have been widely used in the d'Arsonval transducers—galvonometers and meters. The general trend has been to develop a construction which has constant flux throughout the gap in such meter devices. The advent of high coercive force, high energy materials such as Alnico at economical prices has made core magnets feasible for use in edge writing recorders, which require high torque.

Basically, the edge writing recorder of the present invention utilizes a core magnet drive system in a manner different from prior applications of core magnets in meters. The physically uniform, annular flux gap of the recorder of the present invention differs geometrically from the usually irregular-shaped core magnet gap used in meter applications to obtain a constant flux density field. In addition, the core magnet in an edge writing recorder operates at high energies in a small range of about 35° angular coil displacement with a varying flux density for a given angular displacement; whereas, in meter applications, the core magnet operates at lower energies and with constant flux density over a range of approximately 90° of angular coil displacement.

A further object of this invention is to utilize a high energy core magnet to produce a drive system for an edge writing recorder having limited range of angular coil displacement.

SUMMARY

Briefly, in accordance with the invention, an edge writing recorder device comprises a cylindrical core magnet transversely magnetized, having a plane of maximum magnetic intensity, located within and spaced from a cylindrical high permeability support means which acts as a magnetic flux return path. A flux gap is created, between the core magnet and the support means, having decreasing flux density away from the plane of maximum magnetic intensity. A coil of electrically conductive wire is rotatably mounted in the flux gap and is capable of receiving external electrical input signals; at rest position, it is coincident with the plane of maximum magnetic intensity. The amount of torque applied to the coil is directly dependent on the flux density and the magnitude of the signal applied to the coil. The increment of torque on the coil in comparison to the increment of input signal decreases as the coil moves from rest position and thereby nearly compensates for the inherent tangent error introduced in edge writing recorders.

The invention will be better understood from the following description of a preferred embodiment to be read in conjunction with the accompanying drawing, and the features believed to be novel will be more particularly pointed out in the appended claims.

BRIEF DESCRIPTION OF THE DRAWING

FIG. 1 is a section through an edge writing recorder having a core magnet drive system in accordance with this invention, showing the moving coil and associated parts partly in section and partly in elevation;

FIG. 2 is a top view of the edge writing recorder in FIG. 1 and illustrates the increasing effective length of the writing arm of the indicating means;

FIG. 3 is a sectional view through the edge writing recorder taken along the line 3—3 in FIG. 1 showing the relationship of the moving coil to its related magnetic flux circuit components;

FIG. 4 is a schematic sectional view of a cylindrical core magnet being placed within a coil having an arcuate face adjacent the longitudinal surface of the core magnet; and FIG. 5 is an elevation of an end cap, partly in section, illustrating the portions which hold the core magnet rigidly in place.

DESCRIPTION OF THE PREFERRED EMBODIMENT(S)

Referring to FIG. 1 of the drawing, the present invention is shown as embodied in an edge writing recorder 10 for making a visual record of electrical input signals. The recorder 10 comprises a core magnet drive system 11 and an indicating system 12. The drive system 11 fundamentally comprises a cylindrical core magnet 13, a rotatably mounted driving or moving coil 14 and a generally tubular support means 15.

The drive system 11 and the indicating system 12 are interconnected by drive rod or shaft 16. Shaft 16 is connected to the moving coil 14 and turns in unison with it mechanically translating this motion to the writing arm 17 having writing portion or stylus 18 in the indicating system 12.

In the operation of edge writing recorder 10, an electrical signal is applied to coil 14 located in a magnetic field existing between core magnet 13 and the support means 15. The support means 15 provides the high permeability, flux return path for the core magnet 13. The electrical signal applied to the coil 14, due to the magnetic field in which it operates, causes a torque on the coil and results in the moving of the coil 14 against a spring force. This motion is then transmitted through shaft 16 to writing arm 17 which causes the writing portion 18 to make a visible record on media or record 19. The writing portion 18 of the indicating system 12 may be a pressure stylus, a thermal stylus on thermal paper or other such marking device.

As shown in FIG. 2, an inherent problem in such an operation is a tangent error involved in the conversion of rotary motion of the coil to the straight line trace. As the writing arm 17 is moved from the rest or no signal position, the effective length of the writing arm 17 is increased as $\theta$ increases. $\theta$ is the angular deflection of the writing arm 17 from the rest position A.

As shown in FIG. 2, a given input signal is applied to the coil 14 and the writing arm 17 deflects angularly $\theta_1$ due to the torque on the coil to position B. This causes a linear deflection of the writing portion 18 of writing arm 17 in the indicated x-direction of a distance $m$. With the writing arm 17 in position B, a second input signal equal to twice the amplitude and the same polarity of the first signal is applied to the coil 14. Assuming the flux density is constant in the flux gap, the writing arm 17 will deflect angularly $\theta_2$. Under these assumptions, $\theta_1$ will equal $\frac{1}{2}\theta_2$ and the arm 17 will deflect to position C. The writing portion 18 will deflect linearly a distance $n$. The linear deflection $n$ does not equal $2m$; hence, an error in the transformation of rotary motion of the coil 14 to a linear trace is introduced; since it is a function of tangent $\theta$, it is called the tangent $\theta$ error. A similar condition exists when the signal is of opposite polarity and the arm 17 is deflected to the opposite side of rest position A to a position such as D.

In the present invention, the tangent $\theta$ error is compensated for in the novel construction and operation of the core magnet drive system 11 which is described hereafter. In some cases using the described drive system 11, the theoretical nonlinearity has been reduced to as little as 0.2% of full deflection.

The cylindrical core magnet 13 is preferably a generally solid cylinder having a bore 20 along its cylindrical axis as shown in FIGS. 1 and 3. The magnet 13 is preferably magnetized transversely across its cylindrical axis and has corresponding a plane of maximum flux intensity in this direction. The core magnet 13 is preferably composed of a high energy, permanently magnetic material such as an Alnico or other alloy magnetic material or other suitable magnetic material.

The moving or driving coil 14 is made of a multiplicity of turns of enameled, copper or aluminum wire and may be wound lengthwise around a generally rectangular coil frame of non-magnetic material and potted adhesively thereto an integral unit. A frame is provided primarily for convenience in winding the coil and providing extra damping. The frame may be omitted if desired in which case the wire is wound on itself as in this embodiment.

Aluminum wire wound coils have been found to be preferable for use in the embodiment presently being described based on conductivity and inertia factors. A lenthy discussion of details of whether an aluminum or copper wire should be used is not pertinent to the understanding of this invention and rest mainly on the physical size of the drive system desired.

In order to securely hold the coil 14, both the upper and lower end portions 14a and 14b of the coil have a spider support member 21 having four outwardly extending arms 22 to hold onto the coil. Each spider support member 21 is integrally formed of light metal or plastic; the supports 21 hold the coil 14 in compression at its top and its bottom.

As shown in FIG. 3, coil 14 has inner arcuate-shaped face portions 23 adjacent the core magnet 13 in order to reduce the spacing between the coil and the core magnet providing a narrower gap to allow the most flux energy through the coil. In order to insure uniformity of coil windings and for obvious production reasons, the coil 14 is preferably prewound and assembled before the core magnet 13 is inserted. Thus, the core magnet 13 must have relieved sides 24 to allow the coil and magnet to be in closest proximity. The relieved sides 24 are preferably parallel to the direction of magnetization of the core magnet 13 and in this specific embodiment are of a flattened nature. As shown in FIG. 4, the assembly of these two components, the coil 14 and magnet 13, requires that first the magnet's flattened sides 24, transversely inserted within the coil, and the core magnet rotated to have its plane of maximum magnetic intensity coplanar with the coil 14 as shown in FIGS. 1 and 3.

The coil structure is preferably physically reinforced against deformation due to torsional stresses and bending stresses in the plane of the coil 14; in addition, the rotational motion of the coil 14 must be transmitted to the indicating system 12. To these ends, there is provided a rigid drive shaft 16 extending freely through the bore 20 of the core magnet 13. The opposite end spider support members 21 of the coil structure are rigidly secured to this shaft, preferably by a temperature resistant adhesive. A set screw 25 (see FIG. 1) extends through one support member 21 and abuts shaft 16. Set screw 25 assists in anchoring the coil structure to the shaft 16. Preferably the shaft 16 is hollow.

It has been found that the presence of this one-piece shaft 16 extending lengthwise through the core magnet 13 and mechanically attached to the support members 21 of the coil structure greatly enhances the structural rigidity of the coil assembly, so that the latter does not deform out of shape as result of the stresses to which it is subjected. This is important to insure that undesired extraneous mechanical deflections will not occur to affect the accuracy and the stability of the overall drive system 11.

The subassembly of the core magnet 13, coil 14 and shaft 16 fixed to the ends of the coil, is placed within tubular support means 15 which provides the magnetic flux return path to complete the magnet circuit and make the drive system 11 operative. The tubular support means 15 is preferably of high permeability material such as, soft iron or steel. The outer face portions 25 of coil 14 are also preferably arcuate-shaped, as shown in FIG. 3, to allow the support means 15 to be in as close a proximity as possible for maximum magnetic flux intensity through the coil 14. The addition of the support means 15 creates a flux gap 26 between the core magnet 13 and the support means.

The cylindrically shaped flux gap 26 has a flux density which decreases from the plane of maximum magnetic intensity by a factor of approximately 1-sin $\theta$. The flux density is dependent on the length of magnet adjacent the flux gap. With the cylindrical core magnet, the effective length of magnet adjacent the flux gap decreases as the coil is deflected from the plane of maximum magnetic intensity. For small angles of sin $\theta$ approximately equals tan $\theta$. This geometrical relationship, therefore, compensates for the tan $\theta$ error for small angles of coil deflection.

In addition, the high permeability of support means 15 results in an extremely low loss due to stray leakage flux. High loss has been customary in previous pole type magnet penmotors as in Pat. No. 3,088,788—Brown et al. This low leakage flux loss allows the drive systems of the present invention to be placed close together without coupling effects. Also, the stray leakage flux that emerges axially to the core cuts the end portions 14a and 14b of the coil and, therefore, assists in torque buildup in the coil.

The support means 15 carries positioning studs 27 spaced longitudinally on one side. As shown in FIG. 1, the studs 27 are preferably resistance welded at point 28. The studs 27 are located on a flattened surface 29 (see FIGS. 2 and 3) of support means 15 which aids in the alignment of the indicating system 12 with the record 19 and will be discussed in more detail at a later time. The studs 27 may be provided with threads 30 to accommodate attachment to an external support (not shown).

The core magnet 13 is fixed in position within the support means 15 by an upper end cap 31 and lower end cap 32 of insulating material preferably Tenite polypropylene. Both end caps 31 and 32 have a multiplicity of finger-like portions 33 which locate flattened sides 24 of the magnet 13 and thereby horizontally align the magnet 13 (see FIG. 5). Finger-like portions 33 limit the angular coil deflection and, when the end cap is force fitted into the end of support means 15, grip the core magnet 13. Post portions 34 (see FIG. 5) of both end caps 31, 32 hold the magnet 13 in vertical alignment by frictionally abutting the ends of the magnet as shown in FIG. 1. After the end caps 31 and 32 are force fitted into position, screws 35 hold the caps mechanically fixed to the ends of the support means (see FIG. 2).

As shown in FIGS. 1 and 5, each end cap has an end cap bore 36 to allow the shaft 16 passage therethrough. To insure free motion of the shaft 16, each end cap carries an end cap bearing 37 press fitted into the bore which frictionally engages the shaft 16 when it is placed in the bore 35.

Within the lower end cap 32, as shown in FIG. 1, an insulation plate 38 is bonded to the lower end 14b of the coil 14. A plurality of electrical terminal posts 39, which are connected to the coil 14, extend down through the plate 38. Insulated lead-in wires 40 connected to posts 39 extend through an opening 41 in shaft 16 into the hollow interior of the shaft. These lead-in wires 40 extend down and out the lower end of the shaft.

A terminal cap 42 of insulating material, preferably Tenite polypropylene, is secured to the outer face portion of the lower end cap 32. Lead-in wires 40 extend into the terminal cap 42 and are looped around terminal cap post 43 which keeps the slack out of wires and reduces pressure on the ends of the wires attached to the external terminals 44 to which input signals are applied. Terminals 44 and post 43 are carried by terminal cap 42.

A holding and centering means 45 is held to upper end cap 31 by screws 46 (see FIG. 2) which engage the end cap and it includes an upwardly extending portion 47 which is located substantially above the top of the core magnet 13. Slot 48 of the centering means 45 accurately locates the cylindrical axis of the bore 20 in the core magnet 13 through which extends shaft 16.

A torsion wire or rod 49 extends through the hollow shaft 16 and terminates with an enlarged end portion 50 (see FIGS. 1 and 2) positioned in the slot 48 in the centering means 45. Clamping screw 51 holds the upper end 50 of the torsion wire 49 against rotation with respect to the holding and centering means 45 by a compressive force. Torsion wire 50 provides a spring restoring force to the indicating system 12 via the shaft 16 to aid in restoring the arm 17 to its rest position A. Screw 51 may be loosened and a screw driver inserted in the end portion 50, thereby to turn the torsion wire and the entire coil subassembly with respect to the magnetic system. This gives a means of adjustment between the magnetic system 11 and the indicating system 12.

Writing arm 17 is connected to the upper end of the drive shaft 16 by means of a collar 52 located in slot 48 of the centering means 45 and underneath portion 47. The collar 52 is held in position by collar screws 53. The writing arm 17 is driven by the shaft 16. The writing arm 17 has a writing portion 18 for recording a trace laterally across a moving media or record 19 which is in turn driven by drive 54 as shown in FIG. 1. The writing portion 18, as mentioned previously, can be a thermal stylus on thermal paper or a mirror for reflecting light to light sensitive film. The details of the particular indicating means are not important to the present invention; however, for this specific embodiment a thermal stylus on thermal paper is shown.

When collar 52 is rigidly fixed and torsion wire 49 held by the upper extending portion 47 of the centering means 45, the writing means 18 of writing arm 17 is aligned. The collar 52 has a machined portion 55 to provide alignment with the drive system 11 by being put parallel to the flattened surface 29 of the support means 15 in the no signal or rest position A. By having such an alignment procedure, different types of indicating systems 12 can be used with a single drive system 11.

What I claim as new and desire to secure by Letters Patent of the United States is:

1. An edge writing recorder having a permanent core magnet drive system comprising: a coil of generally rectangular form and having a major axis of rotation, said coil having input means to receive external electrical signals; a generally cylindrical permanent core magnet within said coil with the cylindrical axis thereof coaxial with said major axis of said coil, said core magnet magnetized in a direction transverse of its cylindrical axis and having a plane of maximum magnetic intensity, said core magnet having a bore through it along said cylindrical axis; said coil at a rest position located adjacent the plane of maximum magnetic intensity; a generally tubular, high permeability support means surrounding said coil and said core providing a magnetic flux return path for the magnetic flux produced by said core magnet; said support means and said core magnet defining two longitudinally opposed and spaced flux gaps for said coil, said flux gaps having decreasing flux density away from said plane of maximum magnetic intensity, said coil having a generally arcuate cross section in the plane normal to said major axis and in said gap so as to remain in close proximity and a constant distance from said support means and in close proximity and a constant distance from said core; end cap means fixed at at least one end of said support means carrying spacer means to restrict the angular deflection of said coil in a plane normal to said major axis of said coil, said end cap means carrying core magnet support means to rigidly fix said core magnet within said support means; a hollow drive shaft extending through said bore and through said coil at spaced locations along said major axis, said shaft connected at said spaced locations along said major axis to said coil and moving therewith, said shaft extending through at least one end of said support means; and an indicating means connected to said at least one end of said hollow drive shaft extending through said support means for rotating as said shaft and said coil rotate in said magnetic field, said indicating means producing a rectilinear trace.

2. A recorder for use with a record member moving over a straight edge comprising: a coil having a major axis of rotation and having input means to receive external electrical signals, said coil having two spaced apart leg portions; a generally cylindrical permanent core magnet within said leg portions of said coil with the cylindrical axis thereof coaxial with said major axis of said coil, said core magnet being magnetized in a direction transverse of its cylindrical axis and having a plane of maximum magnetic intensity intersecting said leg portions when said coil is at rest, and said core magnet having a bore through it along said cylindrical axis; high permeability magnetic flux return means surrounding said coil and said core and providing a flux return path for the flux produced by said core magnet; said flux return means and said core magnet defining two spaced gaps for said coil, said gaps having a given flux density in said plane of maximum magnetic intensity and decreasing flux density away from said plane of maximum magnetic intensity, each leg of said coil having a generally arcuate cross section in a plane normal to said major axis so that the legs of the coil will remain in close constant proximity to said flux return means and to said core magnet as said coil rotates; end cap means fixed at least to one end of said flux return means and to said core magnet to rigidly fix said core magnet within said flux return means, said end cap means carrying spacer means to restrict the angular deflection of said coil in a plane normal to said major axis of said coil; a drive shaft means extending through said bore and through said coil at spaced locations along said major axis, said drive shaft means being connected to said coil at said spaced locations and moving therewith, one end of said drive shaft means extending through said end cap means; and an indicating means connected to said one end of said drive shaft means for rotating as said drive shaft means and said coil rotate and for cooperating with said record member at said straight edge to produce a rectilinear trace.

3. A recorder as in claim 2 wherein said end cap means carry core magnet support means to rigidly fix said core magnet within said flux return means.

4. A recorder for use with a record member moving over a straight edge comprising: a coil having a major axis of rotation and having input means to receive external electrical signals, said coil having two spaced apart leg portions; a generally cylindrical permanent core magnet within said leg portions of said coil with the cylindrical axis thereof coaxial with said major axis of said coil, said core magnet being magnetized in a direction transverse of its cylindrical axis and having a plane of maximum magnetic intensity intersecting said leg portions when said coil is at rest, said magnet having relieved longitudinal sides parallel to said plane of maximum magnetic intensity to allow said magnet to be placed in close proximity to said coil, and said core magnet having a bore through it along said cylindrical axis; high permeability magnetic flux return means surrounding said coil and said core and providing a flux return path for the flux produced by said core magnet; said flux return means and said core magnet defining two spaced gaps for said coil, said gaps having a given flux density in said plane of maximum magnetic intensity and decreasing flux density away from said plane of maximum magnetic intensity, each leg of said coil having a generally arcuate cross section in a plane normal to said major axis so that the legs of the coil will remain in close constant proximity to said flux return means and to said core magnet as said coil rotates; two end cap means, one located at each end of said flux return means, and said end cap means having finger-like portions to surround and support said magnet, said finger-like portions locating said relieved sides of said magnet; a drive shaft means extending through said bore and through said coil at spaced locations along said major axis, said drive shaft means being connected to said coil at said spaced locations and moving therewith, one end of said drive shaft means extending through said end cap means; and an indicating means connected to said one end of said drive shaft means for rotating as said drive shaft means and said coil rotate and for cooperating with said record member at said straight edge to produce a rectilinear trace.

5. A recorder as in claim 4 wherein said end cap means have postlike portions to support said core magnet and in conjunction with said finger-like means rigidly fix said core magnet within said flux return means.

6. A recorder as in claim 4 wherein said angular deflection of said coil is restricted by said finger-like portions to not more than 45° in a plane normal to said major axis of said coil.

7. A recorder as in claim 5 wherein each of said end cap means has a bearing means mounted therein to frictionally engage said shaft and aid in guiding its rotational movement.

References Cited

UNITED STATES PATENTS

| | | | |
|---|---|---|---|
| 1,901,921 | 3/1933 | Means | 346—76X |
| 1,920,764 | 8/1933 | Nickle | 324—151 |
| 2,454,966 | 11/1948 | Faus | 346—76X |
| 3,005,952 | 10/1961 | Basinger | 324—151 |
| 3,088,788 | 5/1963 | Brown et al. | 346—139 |

FOREIGN PATENTS

| | | | |
|---|---|---|---|
| 902,000 | 7/1962 | Great Britain | 346—117 |

JOSEPH W. HARTARY, Primary Examiner

U.S. Cl. X.R.

346—117; 324—113, 151